Patented May 2, 1944

2,347,736

UNITED STATES PATENT OFFICE 2,347,736

PROCESS FOR PRODUCING ALUMINA

Elbert E. Fisher, St. Louis, Mo., assignor to Marlew W. Fisher, St. Louis, Mo.

No Drawing. Application July 24, 1943, Serial No. 496,044

5 Claims. (Cl. 23—52)

My invention relates to an improved process for making sodium aluminate, the object thereof being to provide an improved process which will permit a greater recovery of substantially pure sodium aluminate from common clays or low grade bauxite contaminated with silica, iron, titanium, and so forth.

In employing my process the raw material to be used is clay such as kaolinite or halloysite, low grade bauxite or like material containing silica and other contaminating substances and from which it is desired to extract sodium aluminate for use in making alumina in such a pure condition that the high quality metal aluminum may be manufactured therefrom. This raw material is first ground fine and then mixed with calcium carbonate in the form of ground limestone and sodium carbonate to provide the sodium oxide. In the place of the sodium carbonate there can be substituted sodium chloride. When this substitution is made, carbon in the form of finely ground coal or the equivalent should be added. The raw material and other substances are thoroughly mixed together, moistened with water and then placed in a furnace which may be either a revolving type or a continuous reverberating type using as little movement of air as possible. The mixture is heated from four to five hours from 1750° F. to 1825° F. If sodium chloride is used the heating should be sufficient to drive off most of the chlorine in the form of hydrogen chloride. During the heating process steam or water is introduced. This completes the first step of my improved process which is well-known and I do not, therefore, claim any novelty therefor in the step per se.

During this step only part of the alumina present in the clay is formed into a sodium aluminate which is soluble in water. If this sodium aluminate were filtered off after treating the furnaced mixture with water, the recovery of the alumina present would be uneconomical for commercial purposes. The amount of alumina recovered could be increased by increasing the sodium present during the first step but such is costly and it will not result in the freeing of all of the alumina present. This becomes obvious when it is realized that the clay is in the form of an aluminum silicate and the sodium unites therewith to form a sodium-alumino-silicate. Much of this sodium-alumino-silicate is fused together with di-calcium silicate (produced by the silica in the clay and the calcium carbonate) and if there is an excess of sodium it will have little effect in making more alumina soluble in the form of sodium aluminate.

In accordance with my invention, the furnaced product resulting from the first step is now mixed with more sodium preferably in the form of sodium carbonate. The amount of sodium carbonate should be such that the sodium oxide present is in the molecular proportion of about 1.85 to each one of aluminum oxide. If, as a result of the first step, there should be present any soluble silica or iron, such can be made insoluble by adding calcium carbonate and calcium chloride. The calcium carbonate should be in the ratio of 200 parts to 60 parts of silica present and only a trace of calcium chloride should be added for the iron.

The mixture of the furnace product and the sodium carbonate (also the calcium carbonate and calcium chloride if added) is now placed in a furnace and heated for from one to two hours at 1750° F. to 1825° F. and then cooled. This heating does not cause the di-calcium silicate to fuse with the sodium oxide present because of the low temperature. It does, however, free the silica. The resulting product is now mixed with water at approximately room temperature and then filtered. This filtrate will now contain a very high percentage of the alumina in the clay. Pilot tests have shown that the recovery at this point is as high as 88 per cent with only very small traces of silica, iron and titanium which are inconsequential. The remainder of the alumina originally present in the raw material remains in the "tailings," these "tailings" also containing some of the sodium. Both the alumina and sodium are occluded in the form of sodium alumino silicate. By treating the sodium aluminate with carbon dioxide, that is, gassing the filtrate, sodium carbonate will be formed and the alumina can be filtered off as aluminum hydroxide. Calcining will produce the oxide. The sodium carbonate can be re-used.

If it is desired to recover the sodium in the "tailings," these may have added thereto ammonium chloride, calcium chloride and calcium carbonate. From this a solution of sodium chloride may be obtained which can be added to the original solution of sodium aluminate. To obtain this sodium chloride the mixture is heated to about 1350° F. for approximately an hour, then cooled, mixed with water, and filtered.

EXAMPLE

In order that my improved process may be better understood an illustrated example of the process will now be given:

*First step*

The following materials are first mixed together in the approximate amounts given:

Pounds

Clay containing about 33% $Al_2O_3$ and 56% $SiO_2$ ---------------------------------- 200
Calcium carbonate ---------------------- 370
Sodium carbonate ---------------------- 158

If it is desired to employ sodium chloride instead of sodium carbonate then the mixture should be as follows:

| | Pounds |
|---|---|
| Clay | 200 |
| Calcium carbonate | 370 |
| Sodium chloride | 182 |
| Carbon in the form of coal | 75 |

Either of the above batches, after being thoroughly mixed, is moistened with water to form a paste and then placed in a furnace which may be either of the revolving type or a continuous reverberating type. If the first batch is run in the furnace, the heat is applied from four to five hours at from 1750° F. to 1825° F. If the second batch is run, it is desirable that steam be introduced during the operation of the furnace and the time of heating should be at least long enough to drive off most of the chlorine in the form of hydrogen chloride. During the heating it is desirable to introduce steam or water vapor in order to assist in the dissipation of the chlorine.

During the furnacing of either of the mixtures, the sodium present becomes a sodium oxide which in the presence of vaporized water or steam and heat at once combines with the alumina in the clay to form a sodium aluminate. This sodium aluminate formed about fifty per cent of the alumina present in the clay. The heating also causes a di-calcium silicate to be formed from the calcium carbonate and the silica compounds and free silica in the clay. The remainder of the alumina which is present in the clay combines with the sodium silica and calcium to form a sodium-alumino-silicate and di-calcium silicate which is not soluble in water. Thus it is seen that when this first step is completed, it will be impossible to recover all of the alumina in the form of a soluble sodium aluminate. It is for this reason that this first step, which has been quite widely used has not been adopted commercially because the alumina recovery is too low. It is to be noted that during this first step, however, the aluminum silicate which has not been formed into a sodium aluminate has been changed into a sodium alumino silicate.

Second step

The furnace product resulting from step 1, whether made from the first batch or from the second batch as outlined, is now mixed with 85 pounds of sodium carbonate. The resulting mixture is again heated to from between 1750° F. to 1825° F. for approximately one hour. The resulting product is then cooled and mixed with water at approximately room temperature. After this mixture, the water is filtered off and then gassed with carbon dioxide to thus cause the forming of an aluminum hydroxide which may be filtered off from the sodium carbonate formed as a result of the gassing. The remaining residue is what is called "tailings."

The adding of sodium carbonate to the furnace produce coming from the first step and the reheating of this resulting mixture will break down the sodium alumino silicate formed during the first step and cause additional sodium aluminate to be produced. This additionally produced sodium aluminate lends itself to solubility in water so that a much weaker sodium content may be obtained than by any other method. The two steps when performed together result in a very large recovery of the alumina in the clay and, as previously mentioned, this recovery has been found to be as high as 88% as a result of pilot tests which closely simulate commercial methods. This recovery might even be better with proper plant operations. As previously mentioned, calcium carbonate and calcium chloride may be added to the mixture before heating as indicated during the second step in order to make free silica and iron insoluble.

Third step

The third step in my process would only be used when it is desired to recover the sodium in the residue or "tailings" from the second step and from a commercial standpoint this is very important as as high as 9% sodium used in the first and second steps and still remaining in the "tailings" can be recovered for re-use. In carrying out this third step the residue or "tailings" from the second step has added thereto ammonium chloride, calcium chloride and calcium carbonate. This mixture is heated to approximately 1350° F. for one hour and then cooled and mixed with water. The solution is a primarily sodium chloride and this can be added to the original solution of sodium aluminate recovered after the second step. When aluminum hydroxide is removed from the sodium aluminate by the gassing operation, the sodium will be recovered in the form of sodium carbonate as already described.

My improved process of producing alumina results in the obtaining of an alumina which has only a very small trace of silica and possibly iron or titanium depending upon whether these elements are present in any substantial percentages in the raw material. As already noted in the general outline of my process, the free silica and iron can be further removed during the second process if such is found to be more than a trace, simply by adding calcium carbonate and calcium chloride along with the sodium carbonate.

It is also apparent, as a result of the description of the process, that many byproducts can be produced from the process such as hydrochloric acid, carbon dioxide gas and various types of sodium salts such as the sulphate, sulphite, sulphide, and so forth. Hydrochloric acid will result when batch No. 2 is used which has sodium chloride as one of the substances mixed with the clay. It is also possible that when the second step is employed to increase or decrease the quantity of sodium carbonate mixed with the product of the first furnace heating and thus obtain a sodium aluminate, which is extremely lean in sodium or one which has an excess of sodium, the latter being highly desired in the manufacture of paper.

Having fully described my invention, what I claim as new and desire to secure by Letters Patent of the United States is:

1. In a process for treating an aluminous siliceous material from an aluminous siliceous material which comprises mixing with the material a calcium compound and a sodium compound, subjecting the mixture to a temperature above 1500 degrees Fahrenheit but not greater than 2000 degrees Fahrenheit for a period greater than four hours, adding to the product a sodium compound, re-subjecting the resultant mixture to approximately the same temperature for approximately one hour, and then mixing the resulting product with water to remove the sodium aluminate formed during the two heating steps.

2. In a process for treating an aluminous siliceous material from an aluminous siliceous material which comprises mixing with the material a calcium compound and a sodium compound, subjecting the mixture to a temperature between 1750 to 1825 degrees Fahrenheit for a period greater than four hours, adding to the product a sodium compound, re-subjecting the resultant mixture to a temperature between 1750 to 1825 degrees Fahrenheit for approximately one hour, and then lixiviating the resulting product with water to obtain the soluble sodium aluminate.

3. In a process for treating an aluminous siliceous material from an aluminous siliceous material which comprises mixing with the material a calcium carbonate and a sodium compound, subjecting the mixture to a temperature above 1500 degrees Fahrenheit but not greater than 2000 degrees Fahrenheit for a period greater than four hours, adding to the product additional sodium carbonate, re-subjecting the resultant mixture to approximately the same temperature for approximately one hour, then mixing the resulting product with water to remove the sodium aluminate formed during the two heating steps, and then gassing the solution with carbon-dioxide to form an aluminum hydroxide.

4. In a process for treating an aluminous siliceous material from an aluminous siliceous material which comprises mixing with the material a calcium compound and a sodium compound, subjecting the mixture to a temperature between 1750 to 1825 degrees Fahrenheit for a period greater than four hours, adding to the product a sodium-compound and a calcium compound, re-subjecting the resultant mixture to a temperature between 1750 to 1825 degrees Fahrenheit for approximately one hour, and then lixiviating the resulting product with water to obtain the soluble sodium aluminate.

5. A process for treating an aluminous siliceous material from an aluminous siliceous material comprising mixing with the material, in a finely ground state, calcium carbonate and sodium carbonate, subjecting the mixture to a temperature between 1750 to 1825 degrees Fahrenheit for a period greater than four hours, adding to the product additional sodium carbonate, re-heating the resultant mixture by subjecting it to a temperature between 1750 to 1825 degrees Fahrenheit for a period approximating one hour, and then mixing the resulting product with water to remove the sodium aluminate.

ELBERT E. FISHER.